US012587794B2

(12) United States Patent
Yang et al.

(10) Patent No.: US 12,587,794 B2
(45) Date of Patent: Mar. 24, 2026

(54) LOUDSPEAKER STRUCTURE AND LOUDSPEAKER DEVICE

(71) Applicant: LUXSHARE ELECTRONIC TECHNOLOGY (KUNSHAN) LTD., Kunshan City (CN)

(72) Inventors: Kai Yang, Kunshan City (CN); YangShuai Hao, Kunshan City (CN); DeHua Kong, Kunshan City (CN)

(73) Assignee: LUXSHARE ELECTRONIC TECHNOLOGY (KUNSHAN) LTD., Kunshan City (CN)

( * ) Notice: Subject to any disclaimer, the term of this patent is extended or adjusted under 35 U.S.C. 154(b) by 163 days.

(21) Appl. No.: 18/240,936

(22) Filed: Aug. 31, 2023

(65) Prior Publication Data

US 2024/0373170 A1 Nov. 7, 2024

(30) Foreign Application Priority Data

May 5, 2023 (CN) ......................... 202310493588.8

(51) Int. Cl.
*H04R 9/06* (2006.01)
*H04R 9/02* (2006.01)

(52) U.S. Cl.
CPC ............ *H04R 9/066* (2013.01); *H04R 9/025* (2013.01); *H04R 2209/024* (2013.01); *H04R 2400/07* (2013.01)

(58) Field of Classification Search
CPC .. H04R 9/066; H04R 9/025; H04R 2209/024; H04R 2400/07
See application file for complete search history.

(56) References Cited

U.S. PATENT DOCUMENTS

2012/0243719 A1* 9/2012 Franklin .................. H04R 1/02 381/333

FOREIGN PATENT DOCUMENTS

| | | | | | |
|---|---|---|---|---|---|
| CN | 1253463 | A | | 5/2000 | |
| CN | 101203067 | A | | 6/2008 | |
| CN | 109982218 | A | | 7/2019 | |
| CN | 109121052 | B | | 1/2021 | |
| CN | 112383854 | B | | 5/2022 | |
| CN | 219421017 | U | * | 7/2023 | H04R 9/02 |
| TW | 479436 | B | | 3/2002 | |

* cited by examiner

*Primary Examiner* — Sunita Joshi
(74) *Attorney, Agent, or Firm* — Birch, Stewart, Kolasch & Birch, LLP

(57) ABSTRACT

Disclosed is a loudspeaker structure including a housing, a magnetic element, a conductive ring and a first vibration assembly. The housing has an accommodation groove and a first sound cavity, the accommodation groove communicates with the first sound cavity, and the first sound cavity has a first opening. The magnetic element is disposed in the accommodation groove. The conductive ring is wound around a peripheral side of the magnetic element, and a current in the conductive ring controls a magnetic field of the magnetic element. The first vibration assembly has a first diaphragm and a first vibration element, the first diaphragm covers the first opening, the first vibration element is disposed on the first diaphragm, and the first vibration element is attracted or repelled by the magnetic field of the magnetic element to drive the first diaphragm to vibrate to produce sound.

19 Claims, 7 Drawing Sheets

LOUDSPEAKER STRUCTURE AND LOUDSPEAKER DEVICE

CROSS-REFERENCE TO RELATED APPLICATION

This application claims the priority benefit of Chinese Patent Application Serial Number 202310493588.8, filed on May 5, 2023, the full disclosure of which is incorporated herein by reference.

BACKGROUND

Technical Field

The present disclosure relates to the technical field of loudspeaker structures, and in particular, to a loudspeaker structure and a loudspeaker device.

Related Art

In the prior art, along with the promotion of quality of life and the popularization of smart mobile devices, the people's concern for the playback sound quality of portable loudspeakers is to constantly pursue the functions that the sound quality can be handled delicately and the music can be stably played. The existing loudspeaker is mainly composed of magnets, coils and diaphragms, and the loudspeaker convert the vibration caused by the frequency of the current into sound. Thus, how to further improve the vibration structure in the loudspeaker to facilitate subsequent production or manufacturing is an urgent issue in the industry.

SUMMARY

Embodiments of the present disclosure provide a loudspeaker structure and a loudspeaker device to solve the problems that the vibration structure in the existing loudspeaker structure is too complicated and it is not easy to assemble the loudspeaker structure.

In order to solve the above-mentioned technical problems, the present disclosure is implemented as follows.

In a first aspect, the present disclosure provides a loudspeaker structure including a housing, a magnetic element, a conductive ring and a first vibration assembly. The housing has an accommodation groove and a first sound cavity, the accommodation groove communicates with the first sound cavity, and the first sound cavity has a first opening. The magnetic element is disposed in the accommodation groove. The conductive ring is wound around a peripheral side of the magnetic element, and a current in the conductive ring controls a magnetic field of the magnetic element. The first vibration assembly has a first diaphragm and a first vibration element, the first diaphragm covers the first opening, the first vibration element is disposed on the first diaphragm, and the first vibration element is attracted or repelled by the magnetic field of the magnetic element.

In one embodiment, a groove bottom of the accommodation groove is further provided with a fixing notch, and the magnetic element is fixed in the fixing notch.

In one embodiment, the housing further has a second sound cavity, the second sound cavity has a second opening, a groove bottom of the accommodation groove is provided with a through hole, the through hole communicates with the accommodation groove and the second sound cavity and is disposed between the accommodation groove and the second sound cavity; the loudspeaker structure further comprises a second vibration assembly, the second vibration assembly has a second diaphragm and a second vibration element, the second diaphragm covers the second opening, the second vibration element is disposed on the second diaphragm, and the second vibration element is attracted or repelled by the magnetic field of the magnetic element.

In one embodiment, the first diaphragm comprises a first folding ring portion and a first plane portion, the first folding ring portion is located on a peripheral edge of the first plane portion, and the first vibration element is disposed on the first plane portion; the second diaphragm comprises a second folding ring portion and a second plane portion, the second folding ring portion is located on a peripheral edge of the second plane portion, and the second vibration element is disposed on the second plane portion.

In one embodiment, the first vibration element is disposed on an inner side surface of the first diaphragm, in the first diaphragm or on an outer side surface of the first diaphragm; and/or the second vibration element is disposed on an inner side surface of the second diaphragm, in the second diaphragm or on an outer side surface of the second diaphragm.

In one embodiment, the first vibration element and the second vibration element are permanent magnets.

In one embodiment, an aperture length of the through hole is less than an outer diameter of the magnetic element.

In one embodiment, the groove bottom of the accommodation groove is further provided with a fixing notch, the through hole is located in the fixing notch, and the magnetic element is fixed in the fixing notch.

In one embodiment, the magnetic element is an electromagnet.

In one embodiment, the loudspeaker structure further comprises a terminal assembly, the terminal assembly is located outside the housing, and the conductive ring is electrically connected to the terminal assembly.

In a second aspect, the present disclosure provides a loudspeaker device with the above-mentioned loudspeaker structure, and the loudspeaker device comprises a casing having a sound production surface, a resonant cavity and a sound pipe, wherein the sound production surface has a first sound production portion and a second sound production portion, the first sound production portion is located on one side of the second sound production portion, the first sound production portion and the second sound production portion communicate with the resonant cavity respectively, one end of the sound pipe is connected to the second sound production portion, the other end of the sound pipe is connected to the resonant cavity, the loudspeaker structure is assembled on the first sound production portion, the first vibration assembly corresponds to an outer side of the first sound production portion, and the second vibration assembly corresponds to a side of the casing with the resonant cavity.

The present disclosure provides a loudspeaker structure and a loudspeaker device, wherein the magnetic field is formed by the combination of the magnetic element and the conductive ring, and the first vibration element is attracted or repelled by the magnetic field to form a vibration, so that the first vibration element drives the first diaphragm to vibrate to produce sound. Furthermore, the loudspeaker device is provided by assembling the loudspeaker structure on the casing, so that the loudspeaker structure not only produces sound through its own body structure, but also produces another sound through the resonance and reflection of the resonant cavity inside the casing.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

Accompanying drawings described herein are intended to provide a further understanding of the present disclosure and form a part of the present disclosure, and exemplary embodiments of the present disclosure and descriptions thereof are intended to explain the present disclosure but are not intended to unduly limit the present disclosure. In the drawings.

Figure 1:
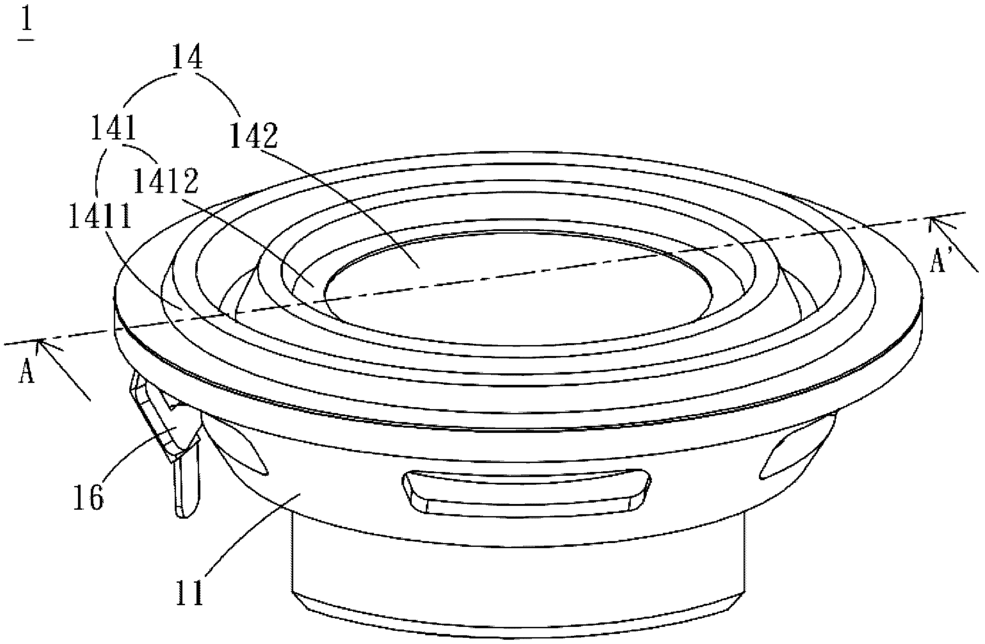
FIG. 1 is a perspective view of a loudspeaker structure according to a first embodiment of the present disclosure.

The reference signs of the accompanying drawings are listed as follows:

1: loudspeaker structure; 11: housing; 111: accommodation groove; 1111: through hole; 1112: fixed notch; 112: first sound cavity; 1121: first opening; 113: second sound cavity; 1131: second opening; 12: magnetic element; 13: conductive ring; 14: first vibration assembly; 141: first diaphragm; 1411: first folding ring portion; 1412: first plane portion; 142: first vibration element; 15: second vibration assembly; 151: second diaphragm; 1511: second folding ring portion; 1512: second plane portion; 152: second vibration element; 16: terminal assembly; 2: loudspeaker device; 21: casing; 211: sound production surface; 2111: first sound production portion; 2112: second sound production portion; 212: resonant cavity; 213: sound pipe.

DETAILED DESCRIPTION OF THE EMBODIMENTS

A plurality of embodiments of the present disclosure will be disclosed with drawings below. For the sake of clarity, many implementation details will be explained together in the following description. However, it should be understood that these implementation details should not be used to limit the present disclosure. That is to say, in some embodiments of the present disclosure, these implementation details are unnecessary. In addition, for the sake of simplifying the drawings, some well-known and commonly used structures and components will be shown in a simple schematic manner in the drawings. In the following embodiments, the same or similar components will be denoted by the same reference signs.

Figure 2:
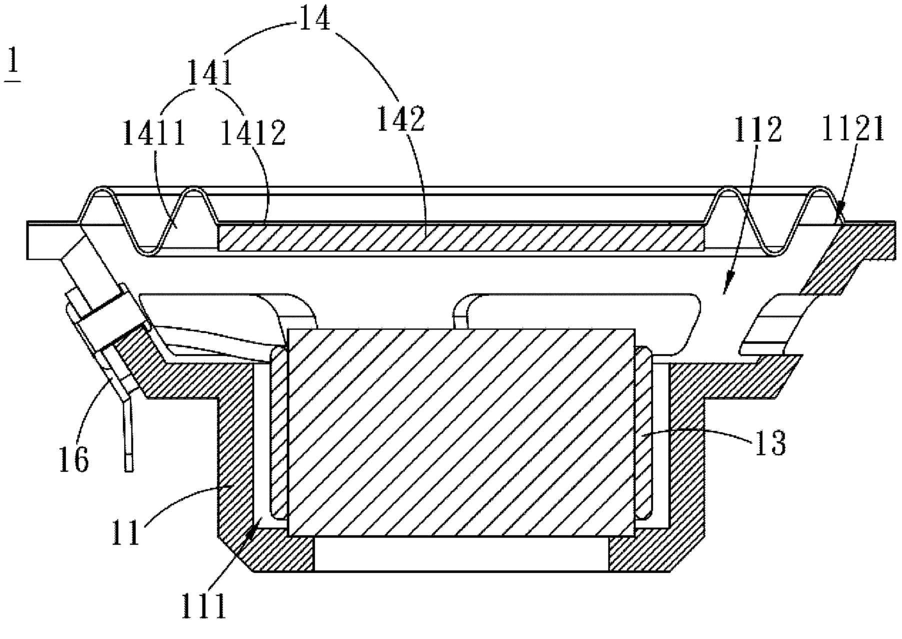
FIG. 2 is a sectional view taken along line A-A' of FIG. 1.

Please refer to FIG. 1 and FIG. 2, wherein FIG. 1 is a perspective view of a loudspeaker structure according to a first embodiment of the present disclosure, and FIG. 2 is a sectional view taken along line A-A' of FIG. 1. As shown in FIG. 1 and FIG. 2, the present disclosure provides a loudspeaker structure 1, which can be a single-sided loudspeaker structure or a double-sided loudspeaker structure. In the first embodiment, taking the loudspeaker structure 1 as a single-sided speaker structure as an example, the description is as follows:

In this embodiment, the loudspeaker structure 1 comprises a housing 11, a magnetic element 12, a conductive ring 13 and a first vibration assembly 14. The housing 11 has an accommodation groove 111 and a first sound cavity 112, the accommodation groove 111 communicates with the first sound cavity 112, and the first sound cavity 112 has a first opening 1121. The magnetic element 12 is disposed in the accommodation groove 111. The conductive ring 13 is wound around the magnetic element 12, and the current in the conductive ring 13 controls the magnetic field of the magnetic element 12. The first vibration assembly 14 has a first diaphragm 141 and a first vibration element 142, the first diaphragm 141 covers the first opening 1121, the first vibration element 142 is disposed on the first diaphragm 141, and the first vibration element 142 is attracted or repelled by the magnetic field of the magnetic element 12. In such the single-sided speaker structure, a magnetic field is formed by the combination of the magnetic element 12 and the conductive ring 13, and the first vibration element 142 is attracted or repelled by the magnetic field to form a vibration, so that the first vibration element 142 drives the first diaphragm 141 to vibrate to produce sound.

Figure 3:
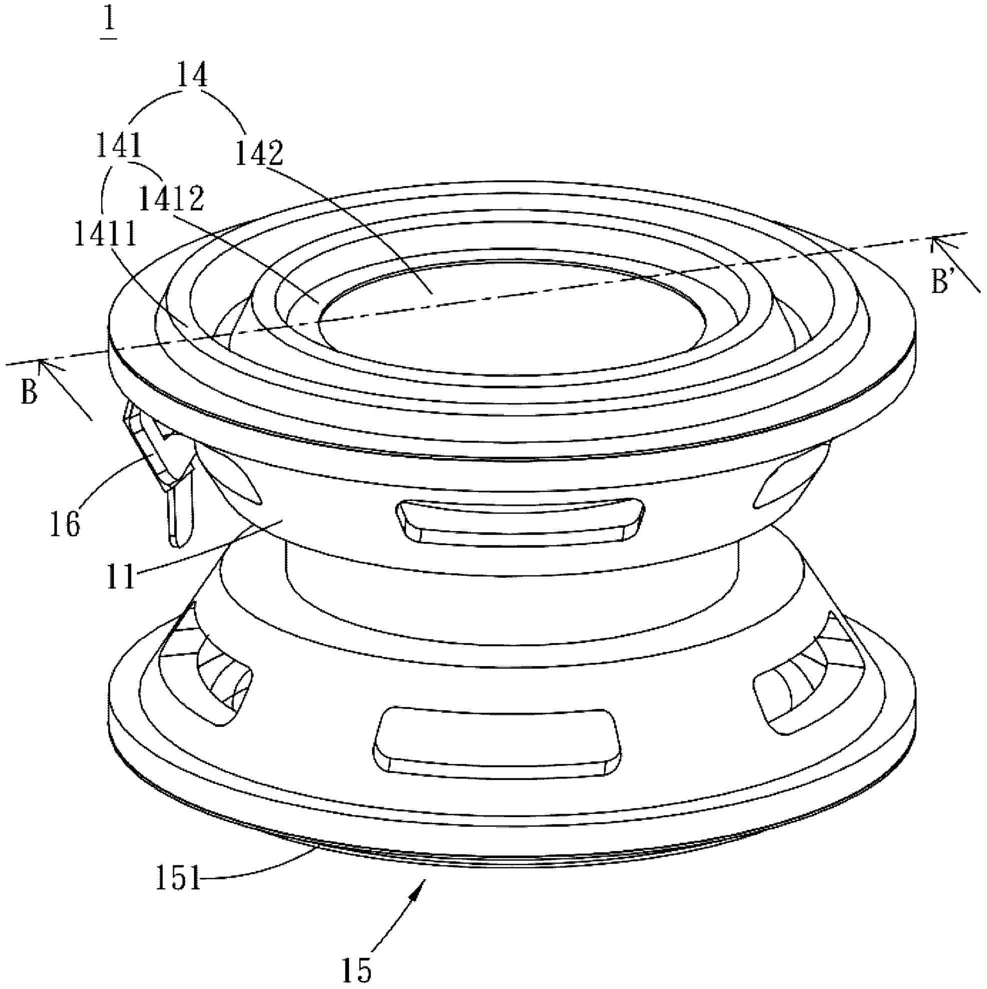
FIG. 3 is a perspective view of a loudspeaker structure according to a second embodiment of the present disclosure.
Figure 4:
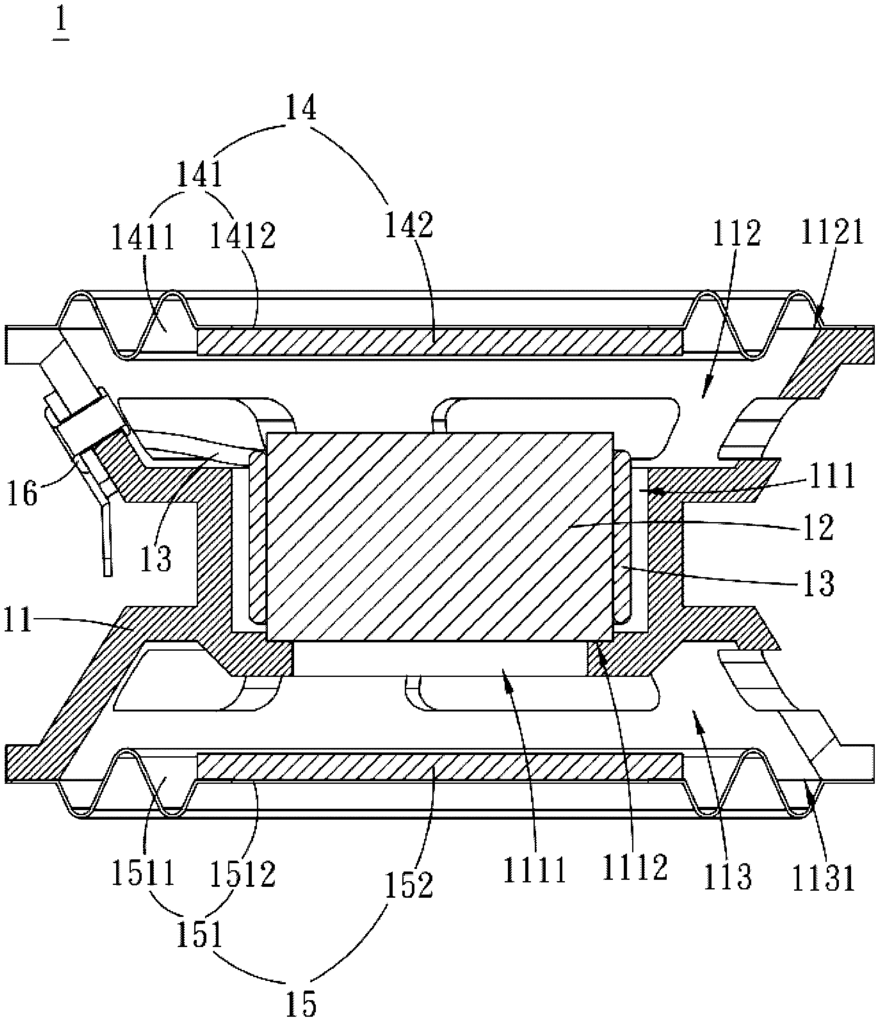
FIG. 4 is a sectional view taken along line B-B' of FIG. 3.
Figure 5:
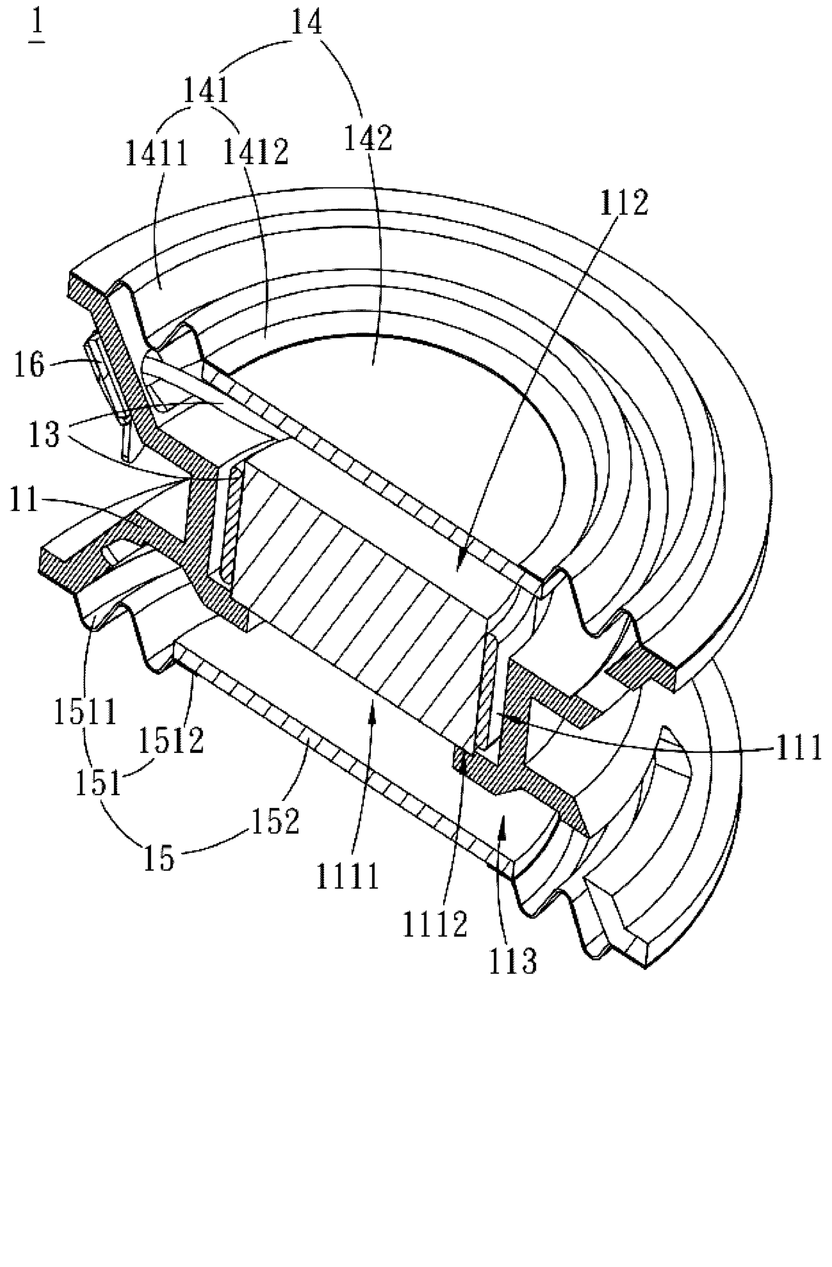
FIG. 5 is a sectional perspective view taken along line B-B' of FIG. 3.

Please refer to FIG. 3 to FIG. 5, wherein FIG. 3 is a perspective view of a loudspeaker structure according to a second embodiment of the present disclosure, FIG. 4 is a sectional view taken along line B-B' of FIG. 3, and FIG. 5 is a sectional perspective view taken along line B-B' of FIG. 3. As shown in FIG. 3 to FIG. 5, in this embodiment, the loudspeaker structure 1 is a double-sided speaker structure. The difference between this embodiment and the first embodiment is that the housing 11 further comprises a second sound cavity 113 and a second vibration assembly 15. In this embodiment, the housing 11 further has a second sound cavity 113, the second sound cavity 113 has a second opening 1131, the groove bottom of the accommodation groove 111 is provided with a through hole 1111, and the through hole 1111 communicates with the accommodation groove 111 and the second sound cavity 113 and is disposed between the accommodation groove 111 and the second sound cavity 113. The loudspeaker structure 1 further comprises a second vibration assembly 15, the second vibration assembly 15 has a second diaphragm 151 and a second vibration element 152, the second diaphragm 151 covers the second opening 1131, the second vibration element 152 is disposed on the second diaphragm 151, and the second vibration element 152 are attracted or repelled by the magnetic field of the magnetic element 12. In such the double-sided speaker structure, a magnetic field is formed by the combination of the magnetic element 12 and the conductive ring 13, and the first vibration element 142 and the second vibration element 152 are attracted or repelled by the magnetic field to form vibrations, so that the first vibration element 142 drives the first diaphragm 141 to vibrate to produce sound, and the second vibration element 152 drives the second diaphragm 151 to vibrate to produce sound.

Figure 6:
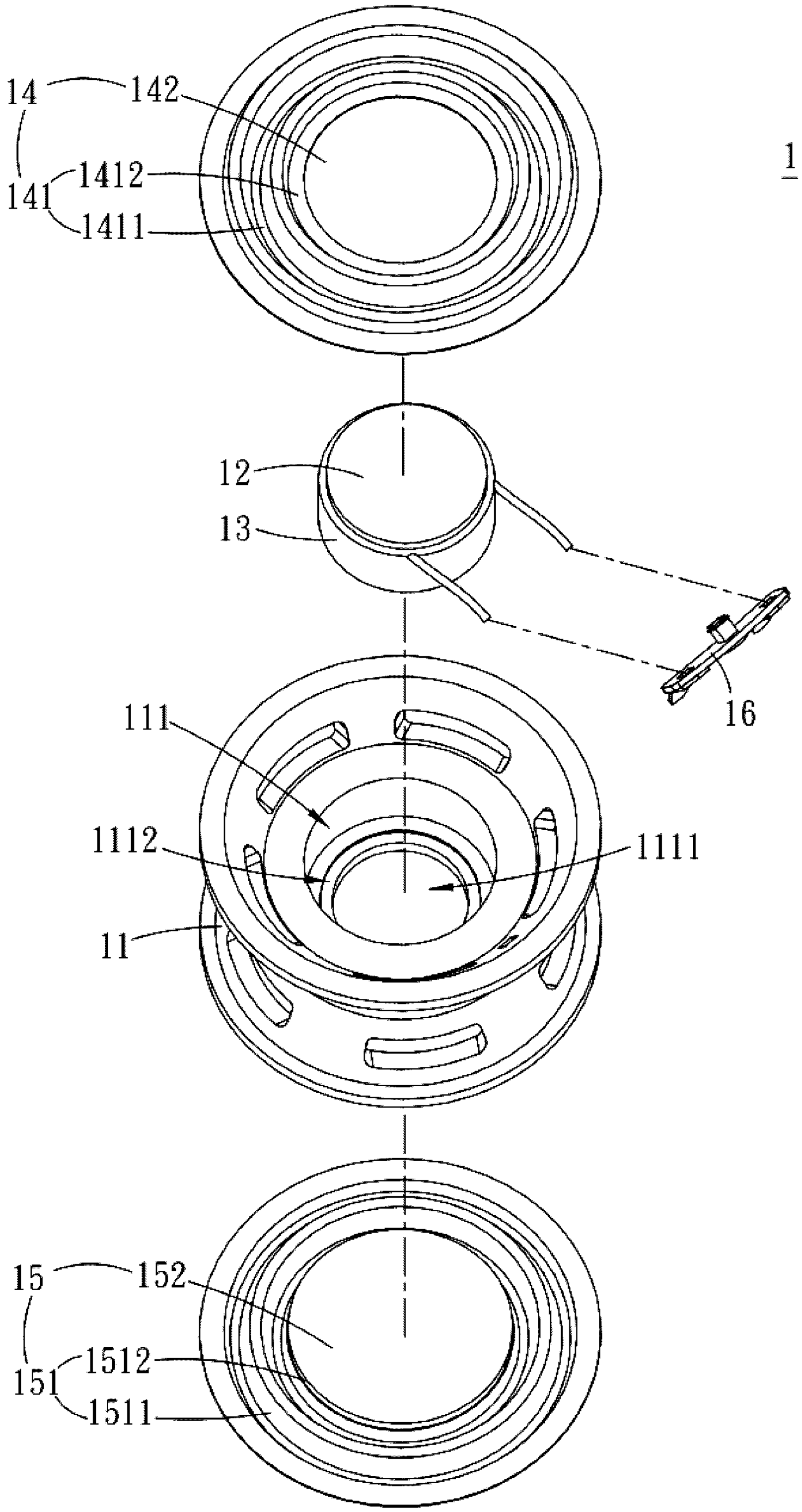
FIG. 6 is an exploded view of the loudspeaker structure according to the second embodiment of the present disclosure.

The difference of the internal structure between the single-sided loudspeaker structure in the first embodiment and the double-sided loudspeaker structure in the second embodiment is only that the structure required for sounding by the double-sided loudspeaker structure is added in the second embodiment. The double-sided loudspeaker structure of the second embodiment is taken as an example, and the description is as follows:

Please refer to FIG. 6, which is an exploded view of the loudspeaker structure according to the second embodiment of the present disclosure. As shown in FIG. 6, in this embodiment, the magnetic element 12 is an electromagnet, which is an element that generates magnetic force through an electric current. The loudspeaker structure 1 further comprises a terminal assembly 16, the conductive ring 13 is wound around the peripheral side of the magnetic element 12, and the two ends of the conductive ring 13 pass through the housing 11, the terminal assembly 16 is located outside the housing 11, and two ends of the conductive ring 13 are electrically connected to the terminal assembly 16. The groove bottom of the accommodation groove 111 is further provided with a fixing notch 1112, and the magnetic element 12 is fixed in the fixing notch 1112. Furthermore, the through hole 1111 is located in the fixing notch 1112, and an aperture length of the through hole 1111 is less than an outer diameter of the magnetic element 12. In this way, the magnetic element 12 is fixed in the fixing notch 1112, the magnetic field of the magnetic element 12 can act on the second vibration element 152 through the through hole 1111, so as to avoid being affected by the shielding of the groove bottom of the accommodation groove 111.

Furthermore, the first vibration element 142 and the second vibration element 152 are permanent magnets. The first diaphragm 141 comprises a first folding ring portion 1411 and a first plane portion 1412, the first ring portion 1411 is located on a peripheral edge of the first plane portion 1412, and the first vibration element 142 is disposed on the first plane portion 1412. The second diaphragm 151 comprises a second folding ring portion 1511 and a second plane portion 1512, the second folding ring portion 1511 is located on a peripheral edge of the second plane portion 1512, and the second vibration element 152 is disposed on the second plane portion 1512. The first vibration element 142 is disposed on an inner side surface of the first diaphragm 141, in the first diaphragm 141 or on an outer side surface of the first diaphragm 141, and/or the second vibration element 152 is disposed on an inner side surface of the second diaphragm 151, in the second diaphragm 151 or on an outer side surface of the second diaphragm 151. In this embodiment, the setting position of the first vibration element 142 or the second vibration element 152 is not limited, and can be adjusted according to the needs of users.

Figure 7:
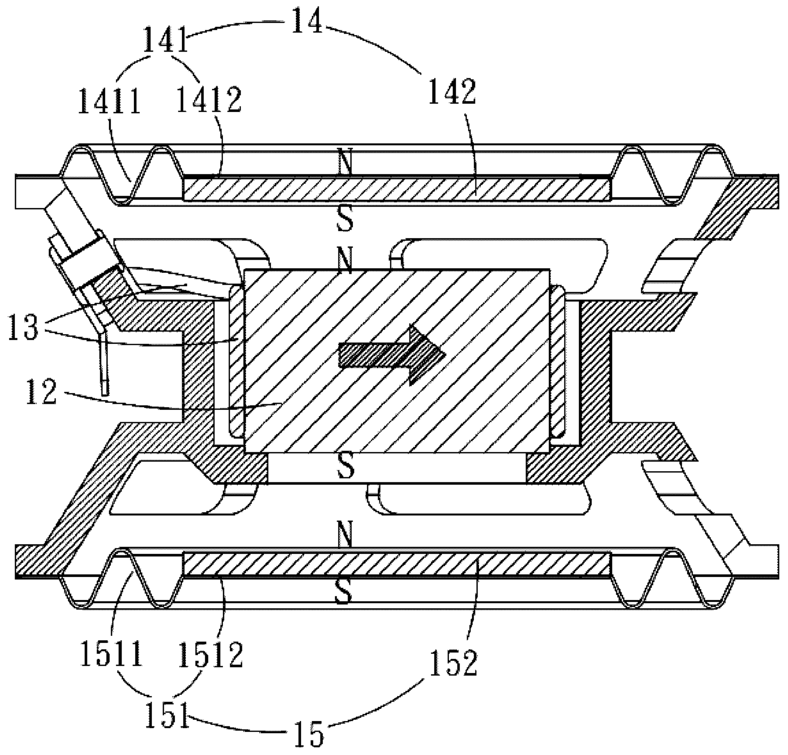
FIG. 7 is a first schematic diagram of the magnetic conduction effect of the loudspeaker structure according to the second embodiment of the present disclosure.
Figure 8:
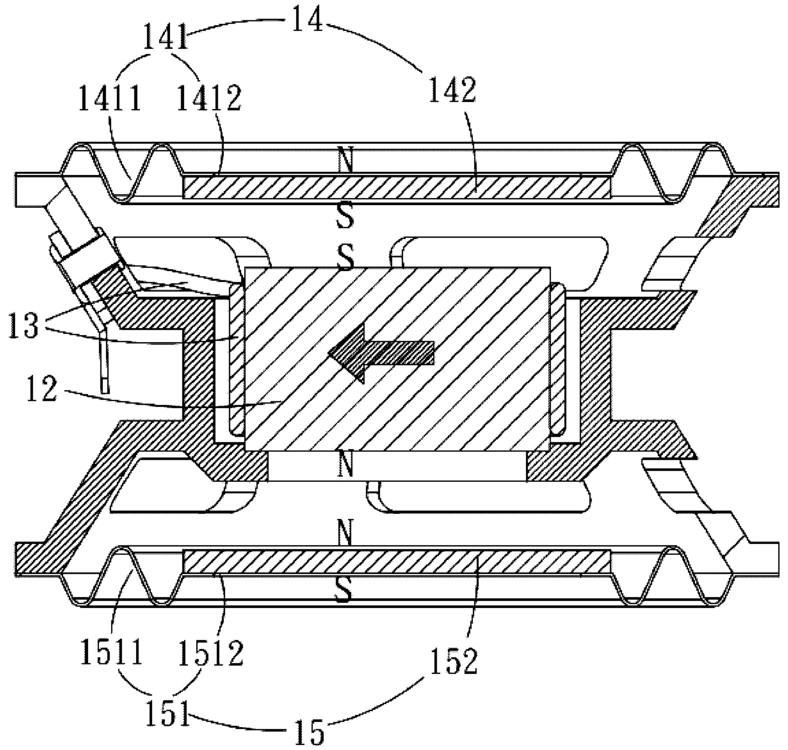
FIG. 8 is a second schematic diagram of the magnetic conduction effect of the loudspeaker structure according to the second embodiment of the present disclosure.

Please refer to FIG. 7 and FIG. 8, wherein FIG. 7 is a first schematic diagram of the magnetic conduction effect of the loudspeaker structure according to the second embodiment of the present disclosure, and FIG. 8 is a second schematic diagram of the magnetic conduction effect of the loudspeaker structure according to the second embodiment of the present disclosure. As shown in FIG. 7 and FIG. 8, in this embodiment, the first vibration element 142 and the second vibration element 152 are permanent magnets, and the magnetic poles of the first vibration element 142 and the second vibration element 152 are fixed on the loudspeaker structure 1. In this embodiment, the outer side of the first vibration element 142 is an N pole, and the inner side of the first vibration element 142 (i.e., the side adjacent to the magnetic element 12) is an S pole. The outer side of the second vibration element 152 is an S pole, and the inner side of the second vibration element 152 (i.e., the side adjacent to the through hole 1111 of the accommodation groove 111) is an N pole.

Please refer to FIG. 7 again. When a current is conducted in the conductive ring 13, the current in the conductive ring 13 flows helically along the direction in which it winds around the magnetic element 12. If the direction of the current is shown by the arrow marked in the middle of the magnetic element 12 in FIG. 7, the direction of the magnetic field can be determined according to the right-hand rule, wherein the right hand is indicated as holding the conductive ring 13, and the four fingers are pointed towards the direction of the current (i.e., the direction of the arrow), and then the thumb is straightened along the central axis of the magnetic element 12, so that the direction of the magnetic field of the combination of the magnetic element 12 and the conductive ring 13 is the direction pointed by the thumb, and the thumb is stretched in the direction from the magnetic element 12 to the first vibration element 142. At this time, the end of the magnetic element 12 close to the first vibration element 142 is an N pole, and the opposite polarity attraction occurs between the N pole of the magnetic element 12 and the S pole of the first vibration element 142. The end of the magnetic element 12 close to the second vibration element 152 is an S pole, and the opposite polarity attraction also occurs between the S pole of the magnetic element 12 and the N pole of the second vibration element 152.

Please refer to FIG. 8 again. The current in the conductive ring 13 flows helically along the direction in which it winds around the magnetic element 12. If the direction of the current is shown by the arrow marked in the middle of the magnetic element 12 in FIG. 8, the direction of the magnetic field can also be determined according to the right-hand rule. At this time, the end of the magnetic element 12 close to the first vibration element 142 is an S pole, and the same polarity repulsion occurs between the S pole of the magnetic element 12 and the S pole of the first vibration element 142. The end of the magnetic element 12 close to the second vibration element 152 is an N pole, and the same polarity repulsion also occurs between the N pole of the magnetic element 12 and the N pole of the second vibration element 152.

The above-mentioned conductive ring 13 flows in the forward or reverse direction of the current, and the current causes the magnetic element 12 to generate a magnetic field corresponding thereto. The conductive ring 13 can adjust the direction of the magnetic field by changing the direction of the current, and can also adjust the magnitude of the magnetic field by adjusting the flow of the current. In this way, the first vibration element 142 drives the first diaphragm 141 to vibrate to produce sound, and the second vibration element 152 drives the second diaphragm 151 to vibrate to produce sound.

Figure 9:
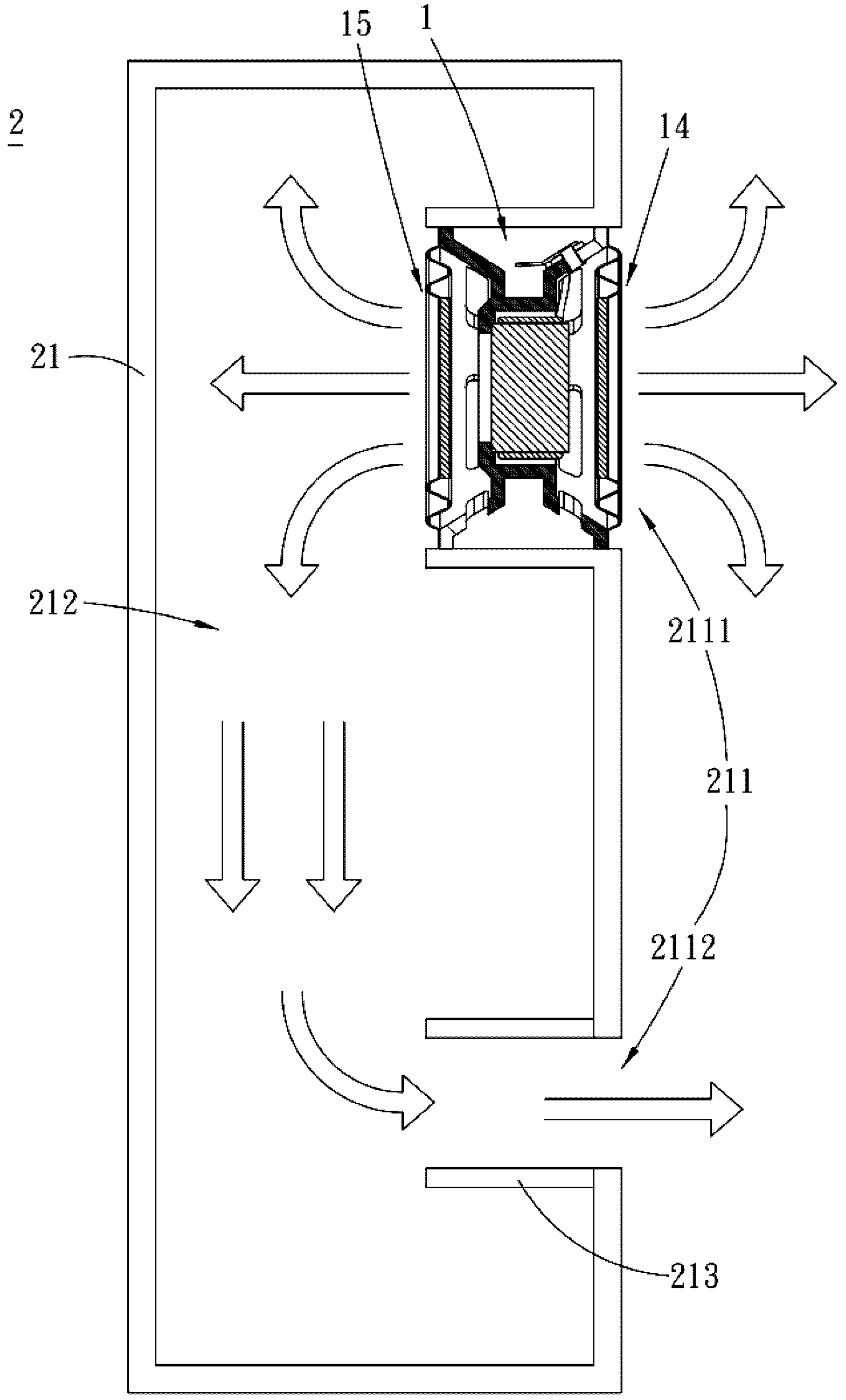
FIG. 9 is a schematic sectional view of a loudspeaker device of the present disclosure.

Please refer to FIG. 9, which is a schematic sectional view of a loudspeaker device of the present disclosure. As shown in FIG. 9, in this embodiment, a loudspeaker device 2 has the loudspeaker structure 1. The loudspeaker device 2 comprises a casing 21 having a sound production surface 211, a resonant cavity 212 and a sound pipe 213, the sound production surface 211 has a first sound production portion 2111 and a second sound production portion 2112, the first sound production portion 2111 is located on the side of the second sound production portion 2112, and the first sound production portion 2111 and the second sound production portion 2112 communicate with the resonant cavity 212 respectively. One end of the sound pipe 213 is connected to the second sound production portion 2112, and the other end of the sound pipe 213 communicates with the resonant cavity 212. The loudspeaker structure 1 is assembled on the first sound production portion 2111, the first vibration assembly 14 corresponds to an outer side of the first sound production portion 2111, and the second vibration assembly 15 corresponds to a side of the casing 21 with the resonant cavity 212.

As mentioned above, the first vibration assembly 14 of the loudspeaker structure 1 can directly produce sound from the first sound production portion 2111, and the second vibration assembly 15 of the loudspeaker structure 1 also produce sound toward the resonant cavity 212, wherein the air inside the resonant cavity 212 communicates with the air outside the resonant cavity 212 by the communication of the second sound production portion 2112 and the sound pipe 213. The position and size of the sound pipe 213 of the loudspeaker device 2 are reasonably designed on the casing 21. The sound is resonated and reflected in the resonant cavity 212, and the sound is produced through the second sound production portion 2112 and the sound pipe 213, so that the sound produced by the second sound production portion 2112 overlaps with the sound produced by the first sound production portion 2111 to form the sound with the same radiation direction, so as to increase the effect of the low frequency of the sound.

In summary, the present disclosure provides a loudspeaker structure and a loudspeaker device, wherein the magnetic field is formed by the combination of the magnetic element and the conductive ring, and the first vibration element is attracted or repelled by the magnetic field to form a vibration, so that the first vibration element drives the first diaphragm to vibrate to produce sound. Furthermore, the loudspeaker device is provided by assembling the loudspeaker structure on the casing, so that the loudspeaker structure not only produces sound through its own body structure, but also produces another sound through the resonance and reflection of the resonant cavity inside the casing.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. Without further limitations, an element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A loudspeaker structure, comprising:

a housing having an accommodation groove and a first sound cavity, wherein the accommodation groove communicates with the first sound cavity, and the first sound cavity has a first opening;

a magnetic element disposed in the accommodation groove;

a conductive ring wound around a peripheral side of the magnetic element, wherein a current in the conductive ring controls a magnetic field of the magnetic element; and a first vibration assembly having a first diaphragm and a first vibration element, wherein the first diaphragm covers the first opening, the first vibration element is disposed on the first diaphragm, and the first vibration element is attracted or repelled by the magnetic field of the magnetic element, wherein the housing further has a second sound cavity, the second sound cavity has a second opening, a groove bottom of the accommodation groove is provided with a through hole, the through hole communicates with the accommodation groove and the second sound cavity and is disposed between the accommodation groove and the second sound cavity; the loudspeaker structure further comprises a second vibration assembly, the second vibration assembly has a second diaphragm and a second vibration element, the second diaphragm covers the second opening, the second vibration element is disposed on the second diaphragm, and the second vibration element is attracted or repelled by the magnetic field of the magnetic element.

2. The loudspeaker structure according to claim 1, wherein a groove bottom of the accommodation groove is further provided with a fixing notch, and the magnetic element is fixed in the fixing notch.

3. The loudspeaker structure according to claim 1, wherein the first diaphragm comprises a first folding ring portion and a first plane portion, the first folding ring portion is located on a peripheral edge of the first plane portion, and the first vibration element is disposed on the first plane portion; the second diaphragm comprises a second folding ring portion and a second plane portion, the second folding ring portion is located on a peripheral edge of the second plane portion, and the second vibration element is disposed on the second plane portion.

4. The loudspeaker structure according to claim 1, wherein the first vibration element is disposed on an inner side surface of the first diaphragm, in the first diaphragm or on an outer side surface of the first diaphragm; and/or the second vibration element is disposed on an inner side surface of the second diaphragm, in the second diaphragm or on an outer side surface of the second diaphragm.

5. The loudspeaker structure according to claim 1, wherein the first vibration element and the second vibration element are permanent magnets.

6. The loudspeaker structure according to claim 1, wherein an aperture length of the through hole is less than an outer diameter of the magnetic element.

7. The loudspeaker structure according to claim 1, wherein the groove bottom of the accommodation groove is further provided with a fixing notch, the through hole is located in the fixing notch, and the magnetic element is fixed in the fixing notch.

8. The loudspeaker structure according to claim 1, wherein the magnetic element is an electromagnet.

9. The loudspeaker structure according to claim 1, further comprising a terminal assembly, wherein the terminal assembly is located outside the housing, and the conductive ring is electrically connected to the terminal assembly.

10. The loudspeaker structure according to claim 1, wherein the magnetic element is an electromagnet.

11. The loudspeaker structure according to claim 1, further comprising a terminal assembly, wherein the terminal assembly is located outside the housing, and the conductive ring is electrically connected to the terminal assembly.

12. A loudspeaker device with the loudspeaker structure according to claim 1, comprising:

a casing having a sound production surface, a resonant cavity and a sound pipe, wherein the sound production surface has a first sound production portion and a second sound production portion, the first sound production portion is located on one side of the second sound production portion, the first sound production portion and the second sound production portion communicate with the resonant cavity respectively, one end of the sound pipe is connected to the second sound production portion, the other end of the sound pipe communicates with the resonant cavity, the loudspeaker structure is assembled on the first sound production portion, the first vibration assembly corresponds to an outer side of the first sound production portion, and the second vibration assembly corresponds to a side of the casing with the resonant cavity.

13. The loudspeaker device according to claim 12, wherein the first diaphragm comprises a first folding ring portion and a first plane portion, the first folding ring portion is located on a peripheral edge of the first plane portion, and the first vibration element is disposed on the first plane portion; the second diaphragm comprises a second folding ring portion and a second plane portion, the second folding ring portion is located on a peripheral edge of the second plane portion, and the second vibration element is disposed on the second plane portion.

14. The loudspeaker device according to claim 12, wherein the first vibration element is disposed on an inner side surface of the first diaphragm, in the first diaphragm or on an outer side surface of the first diaphragm; and/or the second vibration element is disposed on an inner side surface of the second diaphragm, in the second diaphragm or on an outer side surface of the second diaphragm.

15. The loudspeaker device according to claim 12, wherein the first vibration element and the second vibration element are permanent magnets.

16. The loudspeaker device according to claim 12, wherein an aperture length of the through hole is less than an outer diameter of the magnetic element.

17. The loudspeaker device according to claim 12, wherein the groove bottom of the accommodation groove is further provided with a fixing notch, the through hole is located in the fixing notch, and the magnetic element is fixed in the fixing notch.

18. The loudspeaker structure according to claim 1, wherein the magnetic element is disposed between the first vibration assembly and the second vibration assembly.

19. The loudspeaker structure according to claim 2, wherein the fixing notch is between the magnetic element and the second vibration assembly.

* * * * *